Feb. 7, 1933.   H. WEICHSEL   1,896,265
DYNAMO ELECTRIC MACHINE CONSTRUCTION
Filed March 31, 1932
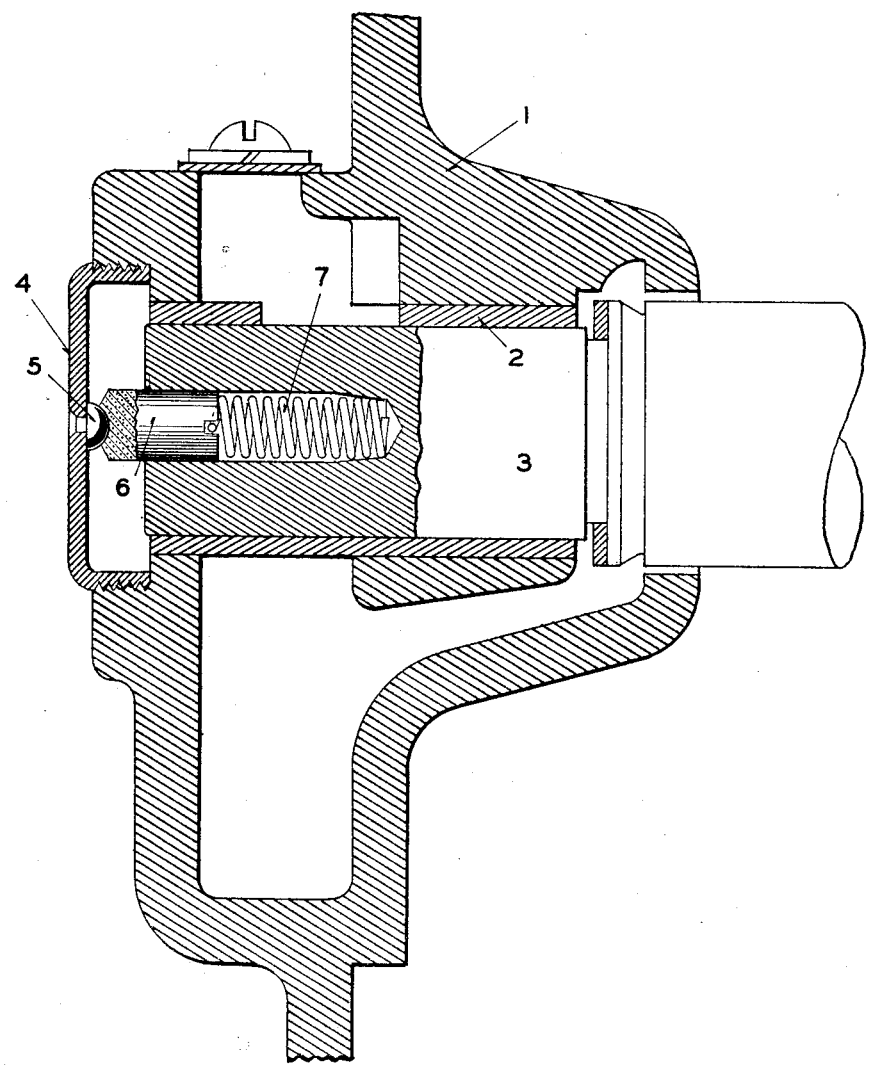
Inventor
HANS WEICHSEL
By *E.C. Huffman*
Att'y.

Patented Feb. 7, 1933

1,896,265

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

DYNAMO ELECTRIC MACHINE CONSTRUCTION

Application filed March 31, 1932. Serial No. 602,117.

My invention relates to means for preventing "shaft" currents in dynamo electric machines from passing through the contact faces of the shaft bearing, thus avoiding deterioration of the bearings as the result of sparking between the shaft and the bearing. In my co-pending application Serial No. 342,070, filed February 23, 1929, I have disclosed means for this purpose and the present invention constitutes an improvement thereon whereby the interruption of the shunt circuit due to the combined effect of end play of the shaft and inertia of the contact element, is avoided. Other characteristics and advantages of the shunting means forming the subject of this application will be apparent from the following description.

The accompanying drawing shows a sufficient portion of a dynamo electric machine to illustrate my invention and comprises a cross sectional view of a bearing housing and the end of the rotor shaft.

In repulsion induction motors as usually constructed, the operation of the brush shifting and commutator short-circuting mechanism may be such, during the transitional period, as to momentarily place one or more armature coils in circuit with the shaft and frame of the machine, the circuit including the shaft bearing faces. Also, in some alternating current motors, voltages induced in the shaft may be the source of currents through the bearing. Such currents very greatly shorten the life of the bearing due to the consequent arcing. In accordance with the present invention this arcing is avoided by establishing a low resistance path between the shaft and the frame of the machine whereby substantial difference of potential between the shaft and the bearing is avoided.

Referring to the drawing, 1 represents a bearing housing carrying the bearing 2 for the shaft 3. The end of the shaft is enclosed by the cap 4 of conductive material which is threaded into the bearing housing as shown. This cap is preferably provided with a central metal contact 5. The shaft is provided with a recess or bore whose axis coincides with the shaft axis, and in this recess is carried carbon contact element 6 which is free to slide therein, whereby there may be free relative longitudinal motion between the shaft and contact element. This element is adapted to bear on the contact point 5 and to be resiliently maintained in engagement therewith by coil spring 7 with which the element is preferably maintained in non-rotative relation by reason of a terminal portion of the spring being seated in a slit in the end of the element. The spring 7 is also preferably slightly over-size with respect to the inner portion of the recess in the shaft, whereby the frictional pressure will be sufficient to cause the spring and, therefore, the contact element 6, to rotate with the shaft.

An important advantage of the structure described over that disclosed in my co-pending application hereinabove referred to, lies in the fact that the contact element 6 may be of sufficient length to have a long life without its being necessary to increase the overall length of the machine as would be the case if the element were resiliently mounted on the cap. And, it has the additional important advantage over said construction in that the end play of the shaft does not cause interruptions of the shunt circuit. Endwise reciprocation of the shaft is compensated for by the compression and expansion of the spring 7, and the coils of this spring having very low inertia in relation to their expansive effort, the element 6 is constantly maintained in engagement with contact 5 notwithstanding sudden shaft movements in the direction increasing the separation between the shaft and the cap.

Having fully described my invention, what I claim as new and desire to secure by Letters Patent of the United States is:

1. In a dynamo electric machine, a rotor shaft provided with a bore in the center of one end thereof, a shaft bearing support, a cap enclosing the end of the shaft and in electrical connection with the bearing support, an electrically conductive element in the shaft recess and capable of longitudinal movement relative to the shaft, and spring means adapted to maintain said element in contact with said cap.

2. In a dynamo electric machine, a rotor shaft provided with a bore in the center of one end thereof, a shaft bearing support, a cap enclosing the end of the shaft and in electrical connection with the bearing support, an electrically conductive element in the shaft recess and capable of longitudinal movement relative to the shaft, and spring means in said recess and in nonrotative relation with said shaft and adapted to maintain said element in contact with said cap.

3. In a dynamo electric machine, a rotor shaft provided with a bore in the center of one end thereof, a shaft bearing support, a cap enclosing the end of the shaft and in electrical connection with the bearing support, an electrically conductive element in the shaft recess and capable of longitudinal movement relative to the shaft, and a coil spring having one end in sufficiently firm frictional engagement with the walls of the shaft recess to prevent relative rotation and the other end in non-rotative connection with the conductor element, said spring being under compression to maintain said element in contact with said cap.

In testimony whereof, I hereunto affix my signature, this 28th day of March, 1932.

HANS WEICHSEL.